No. 836,648. PATENTED NOV. 20, 1906.
H. NELSON.
PROVISION SAFE.
APPLICATION FILED DEC. 30, 1904.
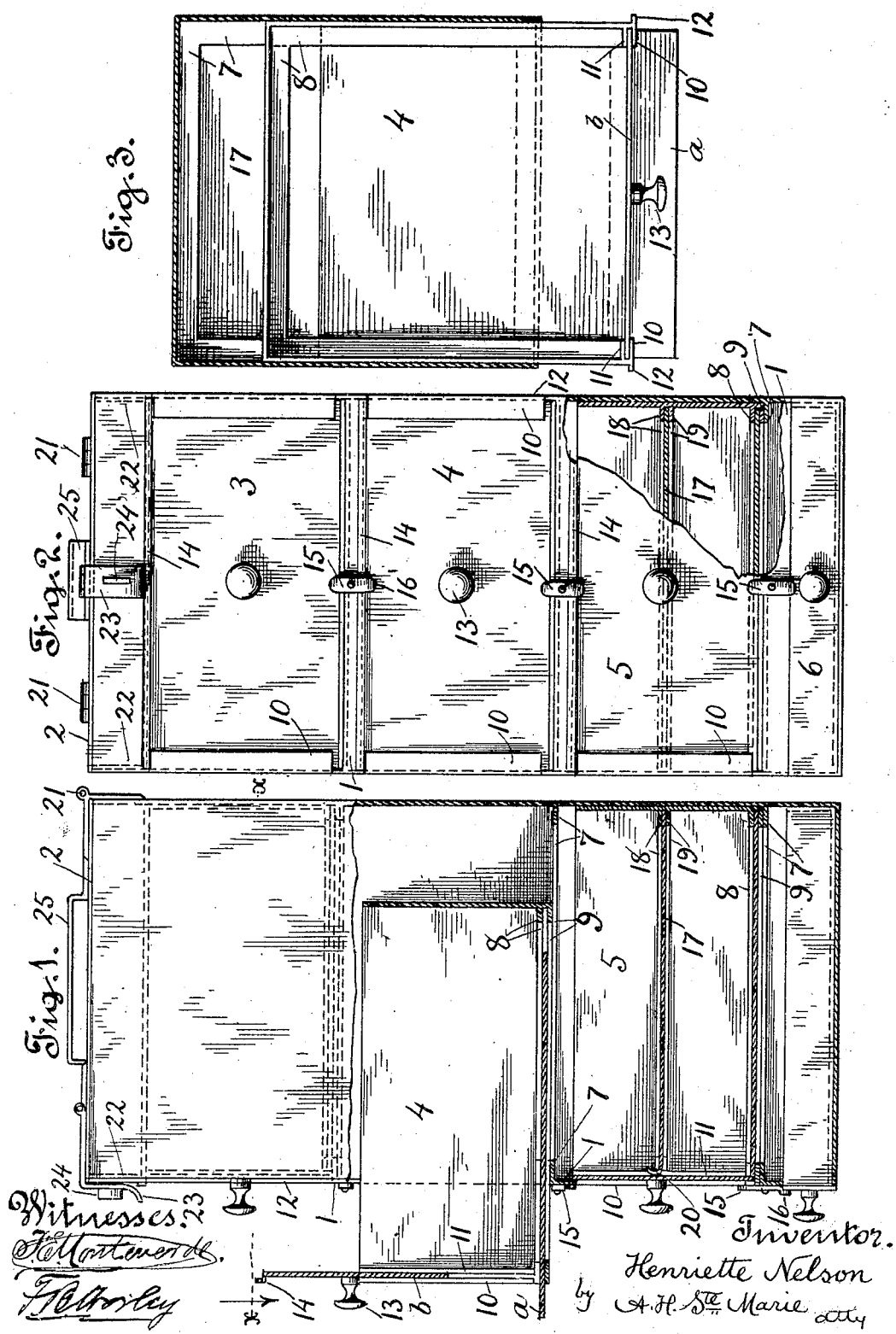

UNITED STATES PATENT OFFICE.

HENRIETTE NELSON, OF SAN FRANCISCO, CALIFORNIA.

PROVISION-SAFE.

No. 836,648.  Specification of Letters Patent.  Patented Nov. 20, 1906.

Application filed December 30, 1904. Serial No. 239,024.

*To all whom it may concern:*

Be it known that I, HENRIETTE NELSON, a citizen of the United States of America, and a resident of the city and county of San Francisco, in the State of California, have invented a new and useful Provision-Safe, of which the following is a specification, reference being had therein to the accompanying drawings.

The present invention is an improved portable adjustable provision-safe in which to store bread, pies, cookies, cakes, and the like.

Housewives usually have certain places and receptacles where they are accustomed to store their different pastries, the bread being kept in a bread-box, cookies in an earthenware or other jar, pies and cakes on a shelf, and, in fact, the various classes of pastry are seldom stored together. Each must be kept in a suitable place, where dust and flies cannot reach them and where the danger of them drying-out or absorbing moisture, as the case may be, is least. In order to keep a cake free from any dirt, it must be covered by a pan or other utensil, which could probably be put to a better or more convenient use and which the cook usually needs just at the time when it is thus employed. Cookies must be kept in some dry place to prevent them from absorbing moisture, and thus losing the crispness which makes them good. Again, the bread must be wrapped in cloth, napkins, or other coverings, pies must be placed on the shelf and covered up, and often cakes are so large that they cannot be covered by any ordinary pan without its pressing against them and marring the icing. In short, all must be in a different place, thus taking up space and utensils which could be utilized to much greater advantage in some other way, especially by people living in small flats, where the rooms are contracted and space is very limited, and, too, people often bake delicate cakes and pies to take to picnics and experience the greatest difficulty in carrying them without ruining their lightness and shape, thus causing all the labor spent to make them dainty go for naught. If they are carried in baskets they must be carefully wrapped, and even then the danger cannot be entirely obviated, and all these various boxes, wrappings, baskets, &c., must be carried home again, making it so annoying that very often women refrain from taking good things along because of the trouble occasioned.

The object of this invention, therefore, is to provide at a reasonable cost a portable, compact, substantially air-tight cabinet or safe which shall have a separate adjustable compartment for each kind of pastry, and, while taking up no more room and weighing no more than the ordinary bread-box, shall be capable of safely carrying bread, pies, cakes of the most delicate kind, and cookies all at once with less trouble than the articles now used for that purpose cause.

In the accompanying drawings, Figure 1 is a side elevation of the cabinet, sectioned for more than half its height and with one of its drawers pulled out. Fig. 2 is a front elevation of the cabinet, with a part of the front of one of the lower drawers broken away to show its mode of construction. Fig. 3 is a sectional view of the cabinet along the line $x$ $x$ of Fig. 1 looking downward, as indicated by the arrow in that figure.

The main portion or body of the cabinet is in the form of a parallelepiped, is made of tin or any desired sheet metal, and its front is open and crossed at regular intervals by strips 1, the top being covered by a hinged lid 2. Four drawers, 3, 4, 5, and 6, fit into the openings formed between the strips 1 on the front of the body, three of them being of the same size, and the fourth (indicated by 6) smaller than the others and different in construction. In order to support these drawers and guide them into proper positions when they are closed, thin metallic strips 7 (seen to best advantage in Fig. 3) are secured around three sides of the interior of the body on a level with the upper edge of the strip 1, and upon these the drawers slide in and out. These strips 7 are of a convenient width and may be secured to the body of the cabinet in any suitable way, soldering being deemed the best and most economical means to employ.

The drawers 3, 4, and 5 are identical in size, shape, and construction, and since what is said of one of them will apply equally to the others only the drawer 4, which is seen partly pulled out in Figs. 1 and 3, will be described. The back and the two sides are of the same shape and made of thin metal, either in one piece, suitably bent to form the corners of the drawer, or in separate pieces, united by means of rivets or solder. Around the bottom of the sides and back two guide-strips 8 and 9 are suitably secured, the same being placed horizontally at a sufficient distance apart to permit the bottom piece a of the drawer to pass between them and the lowermost strip extending across the front of the box and holding the sides at the proper distance from each other. This bottom piece is not stationary, but is capable of being pulled out and pushed in, as is clearly shown in Figs. 1 and 3. To the outer ends of and running almost the entire height of the drawer's sides two vertical guide-strips 10 and 11 are likewise attached, leaving sufficient space between them for the front piece b of the drawer to slide up and down and enough at the bottom for the bottom piece to slide in and out. A small outwardly-turned flange 12 is also formed on the outer end of each side, operating to abut against the body of the cabinet when the drawer is closed, and thus make a tighter fit. In the middle of the front piece a knob 13 is provided, by means of which the front piece is easily moved up or down and the drawer readily pulled out or closed. Another flange 14, which extends forwardly across the upper edge of the front piece, abuts against the lower edge of the strip 1 when the drawer is closed, thereby locking the said piece against removal and also making a snug fit at that point and lessening the danger of any air or moisture entering the drawer. At the center of each of the strips 1 a catch 15 is fixed, and in order to permit it to pass over the flange 14 and hold the drawer shut it is provided with an offset 16 on one end, Fig. 1.

In addition to the above-mentioned parts, the drawer 5 comprises a plate 17, which divides it into two compartments and is adapted to slide between a second series of metallic guide-strips 18 and 19, secured to the drawer's back and sides at about the center thereof and spaced from each other in the manner described in connection with the strips 8 and 9, guiding the bottom piece of the drawer 4. The plate 17 moves in and out in the same manner as does the bottom piece of the said drawer 4. The drawer 5 is thus made divisible into two parts in order to hold more pies or other thin articles when that becomes desirable, and when larger articles are to be stored or kept in the cabinet the dividing-plate may be easily removed after first raising the front piece. As shown in Fig. 1, the plate 17 is slightly turned up, as at 20, in the middle of its front edge to afford a convenient hold on it when moving it in or out. This same feature, it will be understood, is likewise applicable to the sliding bottoms of the several drawers. A similar dividing-plate, it need hardly be said, could be used in drawers 3 and 4, as well as in drawer 5.

The bottom drawer 6 is not made adjustable, as are the others, but is formed after the manner of the ordinary kind, its front and bottom being integral with its sides and back. It is designed principally to contain the removable parts of the other drawers when they are not in use, (either as dividing-pieces or as trays, &c.;) but its utility is not necessarily limited to that purpose, and it may well be used to hold small articles of food which may be placed in the cabinet. The lid 2 is secured to the body of the cabinet by means of two hinges 21. It is preferably provided with an under flange 22, (indicated by dotted lines only,) which fits tightly into (or may be fitted over) the upper end of the cabinet, and it is secured when closed by means of a hasp 23, which passes over a staple or stud 24. A handle 25 is provided on the top of the cover, by which the cabinet may be carried conveniently.

The advantages gained by making the parts of the drawers removable will be easily seen. After a number of pies have been placed side by side in one of the drawers and it is desired to remove a particular one, instead of reaching in and taking out several until the one wanted can be conveniently reached, the whole bottom may be removed, the desired pie selected, and the slide returned without having disturbed the other pies. If a housewife should bake an extra number of pies, she could easily find room to store them by inserting the dividing-slide of the drawer 5 and placing her pies in each of the drawers formed thus, besides using the small drawer 6 at the bottom and the upper drawers 3 and 4, if necessary. Again, if she should bake two or more fancy layer-cakes, which are large and delicate, the middle slide of the drawer 5 might be removed and space sufficient for the largest cakes thus provided in it and the drawer above it. If it should become desirable to fill the whole with bread or cookies, all the bottom slides might be removed and the entire cabinet turned into one continuous receptacle. It is thought, however, that for the ordinary housekeeper the most convenient way of employing the various drawers will be to use the top for bread, the second for cookies or layer-cakes, and the lower two for pies, doughnuts, crullers, and the like. The cabinet when complete, being made of light metal, will not only be strong and durable, but will be light and easily carried. Also much of the danger of dampness and dust reaching the articles placed in it will be obviated, and whatever it contains will retain its lightness and shape for a longer time than would be possible by simply placing on a shelf and covering with a pan or napkin. No expensive materials are used in the construction of this cabinet or safe, and it is believed that it can be made inexpensive enough to have a place in every household, thus saving much space and annoyance to those operating the culinary department.

Having now described my invention, what

I claim, and desire to secure by Letters Patent of the United States, is—

1. In a provision-safe, a hollow body having a suitable cover and an open front provided with permanent cross-pieces, supports on the interior of the body on a level with the tops of said cross-pieces, and drawers on said supports and cross-pieces, the front piece and bottom of each drawer being removable, the bottom fitting between the rear wall of the drawer and said front piece when in position and being thereby locked against removal.

2. In a provision-safe, a hollow body having a suitable cover and an open front provided with cross-pieces, supports on the interior of the body on a level with the tops of said cross-pieces, and drawers on said supports and cross-pieces, the forward ends of the side pieces of each drawer being provided with inwardly-extending flanges, guide-strips around the sides and back at the bottom of each drawer, one of said strips extending across the front of the drawer, a removable bottom between said strips, and a removable front between said flanges, the lower edge of which extends down forwardly of the bottom and prevents its removal until the front is raised.

3. In a provision-safe, a hollow body having a suitable cover and an open front provided with cross-pieces, drawers in the body, one or more of said drawers being provided with a removable bottom and a removable partition parallel therewith, and a vertically-movable front piece adapted to pass down in front of said partition and bottom and thereby lock them against removal, the upper edge of said front piece being adapted to fit under the cross-piece above it and be thereby locked against removal when the drawer is closed.

4. In a provision-safe, a hollow body having a suitable top and an open front provided with permanent cross-pieces, drawers in the body, each provided with a removable bottom, a vertically-movable front piece adapted to pass down in front of said bottom and lock it in position, the upper edge of said front piece being flanged and adapted to fit under the cross-piece above it and lock said front piece against removal when the drawer is closed, and a catch pivotally secured to each cross-piece, the ends of which are adapted to lock two drawers in position, the lower end being offset to fit over said flanged edge of the front piece.

In testimony whereof I affix my signature in presence of two witnesses.

HENRIETTE NELSON. [L. S.]

Witnesses:
 A. H. STE MARIE,
 CHAS. T. STANLEY.